United States Patent
Loeb et al.

(10) Patent No.: US 6,711,549 B1
(45) Date of Patent: Mar. 23, 2004

(54) METHOD OF ACCELERATING DELIVERY OF MAGAZINES TO A NEW SUBSCRIBER

(75) Inventors: Michael Loeb, Darien, CT (US); Paul Larsen, Fishkill, NY (US)

(73) Assignee: Synapse Group, Inc., Stamford, CT (US)

( * ) Notice: Subject to any disclaimer, the term of this patent is extended or adjusted under 35 U.S.C. 154(b) by 0 days.

(21) Appl. No.: 09/528,643

(22) Filed: Mar. 20, 2000

(51) Int. Cl.$^7$ .............................................. G06F 17/60

(52) U.S. Cl. .............................................. 705/8; 705/7

(58) Field of Search ............................................. 705/8

(56) References Cited

U.S. PATENT DOCUMENTS

| | | | | |
|---|---|---|---|---|
| 5,029,830 A | * | 7/1991 | Quadracci | 270/52.03 |
| 5,320,209 A | * | 6/1994 | Del Monaco et al. | 198/358 |
| 5,666,493 A | * | 9/1997 | Wojcik et al. | 705/22 |
| 5,689,648 A | * | 11/1997 | Diaz et al. | 348/473 |
| 5,892,909 A | * | 4/1999 | Grasso et al. | 709/201 |
| 5,926,796 A | * | 7/1999 | Walker et al. | 705/16 |
| 6,014,641 A | * | 1/2000 | Loeb et al. | 705/1 |
| 6,332,124 B1 | * | 12/2001 | Loeb et al. | 705/1 |
| 6,334,113 B1 | * | 12/2001 | Walker et al. | 705/16 |
| 6,535,857 B1 | | 3/2003 | Clarke, III et al. | |

FOREIGN PATENT DOCUMENTS

FR 2757656 A1 * 6/1998 ............ G06F/17/60

OTHER PUBLICATIONS

Manly, Lorne. "Publishers test four–day delivery," Folio: The Magazine for Magazine Management, v23n14 pp: 35. Sep. 1, 1994.*

Bogardus, Tim. "Production primer: How to find the right printer and avoid common production pitfalls," Folio: The Magazine for Magazine Management, v25n2 pp: 63–65+. Feb. 1, 1996.*

Townsend, Holly. "Magazine must–knows for the CEO," Association Management, v46n9 p70(7). Sep. 1994.*

Schnuer, Jenna. "They're not just subscribers!They're customers!" Folio: The Magazine for Magazine Management, v24n14 pp: 50–52+. Sep. 1, 1995.*

Manly, Lorne. "Printers move into fulfillment operations," Folio: the Magazine for Magazine Management v24, n1, p19(1), Jan. 15, 1995. [Dialog].*

(List continued on next page.)

Primary Examiner—Tariq R. Hafiz
(74) Attorney, Agent, or Firm—Morgan, Lewis & Bockius, LLP (57) ABSTRACT

A system and method have been developed to accelerate the delivery of the first issue(s) of a publication as required to fill a new subscription order. The system and method collect the information on a new subscription order and based on the date when an order is received, determine the availability at the printing houses of a current issue of the magazine subscribed to and instructs the printing house with an available current issue to accelerate the delivery of the current issue to the subscriber. The system and method further tracks the delivery of issues in response to a new subscription order to ensure that delivery of currently available issues is continued until the new subscription enters the regular fulfillment schedule. This ensures early and continuous delivery to fulfill the new subscription order. The system and method can also track the number of issues delivered under the accelerated delivery system and adjust the number of issues to be delivered for the full term of the subscription order.

42 Claims, 9 Drawing Sheets

OTHER PUBLICATIONS

Shaw, Russell, "Web pumps up print subscriptions; but technical hurdles still make online fulfillment a tricky process," Business Marketing v83, n1, p6(1), Jan. 1998. [Dialog].*

Metcalf, Slade R. "Printing contracts: 15 negotiating points," Folio: the Magazine for Magazine Management v17, n9, p130(5), Sep. 1988. [Dialog].*

Kalamon, Chris. "9 steps to control fulfillment operations," the Magazine for Magazine Management v23, n19, p179(2), 1995. [Dialog].*

Hochwald, Lambeth. "Fulfillment fastforward," Folio: The Magazine for Magazine Management v26n13 pp:44–46, Oct. 1, 1997 [Dialog].*

"25 good ideas—and a few really bad ones," Folio: The Magazine for Magazine Management, Apr. 1, 1997 [Proquest].*

Phillips, Lisa. "It's (still) a Mac thing," Folio: The Magazine for Magazine Management, Oct. 1, 1997 [Proquest].*

"FEDEX Delivery: It's the 'Wired' Way, Not the Tired Way," Phillips Business Information, Inc., Oct. 24, 1994 [STN].*

Segal, David. "Modem Times, Ancient Ways; High–Tech Efficiencies Elude Some Industries," The Washington Post, Aug. 9, 1997 [Proquest].*

* cited by examiner

Subscriber Database 354

| Consumer ID | Consumer Name and Address | Subscription Date | Magazine ID | Geographic Location Code |
|---|---|---|---|---|
| 071168 | A. Smith<br>45 Main Street<br>NY, NY 10023<br>asmith@yahoo.com | 7/15/99 | 112773<br>995568<br>102091 | NE |
|  |  |  |  |  |
|  |  |  |  |  |
|  |  |  |  |  |
|  |  |  |  |  |

Fig. 5

Magazine Database 356

| Magazine ID | Magazine Name | Publication Frequency | Publisher ID | Fulfillment Center ID | Printing House ID | New Subscription Code | Publisher Charge (New Subscription) | Publisher Charge (Renewal) |
|---|---|---|---|---|---|---|---|---|
| 112773 | Engineering News | Weekly | 012678 | 021935 | 10285 | X | $5 | $1.25 |
| | | | | | | | | |
| | | | | | | | | |
| | | | | | | | | |

Fig. 6

Publisher Database 358

| Publisher ID | Publisher Name | Publisher Information (contact, address, phone) | List of Magazine IDs Published |
|---|---|---|---|
| 012678 | Time, Inc. | Gerard A. Haddad<br>345 Park Avenue<br>NY, NY 10154 | 112773<br>120965<br>100843 |
| | | | |
| | | | |
| | | | |

Fig. 7

Fulfillment Center / Printing House Database 359

| Fulfillment Center ID | Fulfillment Center Name | Fulfillment Center Information (contact, address, phone, etc.) | Printing House ID | Printing House Name | Printing House Information (contact, address, phone, etc.) | List of New Publication Subscriptions | Accelerated Delivery Counter |
|---|---|---|---|---|---|---|---|
| 021935 | CDS | Rich Erwine 345 Park Avenue NY, NY 10154 | 105142 | ABC Printers | Glen Koch 123 Main Street New York, New York 10280 | 112773 | 2 |
| | | | | | | 120965 | 1 |
| | | | | | | 100843 | 2 |
| | | | | | | 090296 | 3 |

METHOD OF ACCELERATING DELIVERY OF MAGAZINES TO A NEW SUBSCRIBER

BACKGROUND OF THE INVENTION

1. Field of the Invention

The present invention relates to a system and method of accelerating the delivery of magazine issues to a new subscriber and to keep records of the number of issues delivered on an accelerated basis for adjustment against normally delivered issues.

2. Description of the Related Art

The magazine industry is old (200 years and counting), diversified and large. According to statistics, there are over 3,000 magazines published covering a diversity of subject matters, although only about 600 are tracked by trade organizations such as the Audit Bureau of Circulations (ABC). The industry generates roughly $25 billion each year from the sale of advertising space, single copies on the newsstand and subscriptions. Each year Americans spend $8 billion to purchase over 300 million subscriptions. Of the 300 million subscriptions, approximately, 120 million are renewals and 180 million are new subscriptions.

The industry sells and services subscriptions in many different ways. Publishers often outsource subscription marketing. Presently, about 60% of all new subscriptions are provided by third party marketers known in the trade as subscription agents or "agents". Typically, the agent markets the initial subscription to consumers and turns over the information on a new subscriber to the publisher (or a publisher's fulfillment house). The remaining 40% of the new subscription orders are placed directly with the publishers.

The filling of a subscription order and the servicing of the subscription are also typically outsourced to third party subscription providers known as fulfillment centers, fulfillment houses or fulfillment bureaus. The fulfillment centers collect and store information on each subscriber, including the name, address, term of subscription and payment; manufacture mailing labels; print, mail and process renewal notices and bills; and provide subscriber service. The fulfillment centers collect the information on the subscription orders from the publishers and the agents, bundles the information for different magazines and provide the number of subscribed issues with the names and addresses to printing houses. Printing houses are typically responsible for manufacturing trade publications, placing the subscriber's name and address on the publication cover, and entering the copies into the mail stream. The printing houses then print the number of issues of each magazine required to fill the subscription orders. The name and address labels are also printed and attached to each issue and mailed out to each subscriber.

Methods for increasing the subscription sales of a magazine have been available. For example, U.S. Pat. No. 5,926,796 describes a method of converting a single sale of an issue of a magazine at a retail outlet to a subscription. However, the conversion of a single sale to a subscription does not mean that the subscriber will receive the next available issue or issues of the magazine.

Presently, the process of collecting the information on the new subscriptions, bundling the information, providing instructions to the printing houses, verifying payment, etc. takes time. As a result, the first issue mailed out in response to a new subscription order usually takes six to eight weeks, or even longer. The new subscriber is often warned of this delay prior to delivery of the first issue of the magazine subscription. Unfortunately, the information provided in magazines is "news" and is perishable. As such, "old" issues cannot be delivered to meet a new subscription order. Current issues must be supplied. The new subscriber is deprived of the information desired from the subscription during the delay. Further, a delay of six to eight weeks means that the revenue that should have been generated from the new subscription order for the 6 to 8 weeks is lost. This is particularly true for weekly magazines, where many issues are published between the time the order is made and the time when the order is fulfilled.

SUMMARY OF THE INVENTION

A system and method have been developed to accelerate the delivery of the first issue(s) of a publication as required to fill a new subscription order. The system and method collect the information on a new subscription order and based on the date when an order is received, determine the availability at the printing houses of a current issue of the magazine and instructs the printing house with an available current issue to accelerate the delivery of the current issue to the subscriber. The system and method further tracks the delivery of issues in response to a new subscription order to ensure that delivery of currently available issues is continued until the new subscription enters the regular fulfillment schedule. This ensures early and continuous delivery to fulfill the new subscription order. The system and method can also track the number of issues delivered under the accelerated delivery system and adjust the number of issues to be delivered for the full term of the subscription order.

In one aspect of the present invention, the system comprises a system of collecting new subscription orders; sorting the new subscription orders to determine the magazine subscribed to by a new subscriber, determine the current availability of the magazine ordered, determine the identity of a printing house with an available warehoused current issue and instructing the printing house with the available issue to deliver it to the new subscriber.

In another aspect of the invention, the method and system tracks the order to determine when the next issue will be delivered, and if it is not the next-in-line issue, the embodiment further instructs the accelerated delivery of the next-in-line issue to ensure continuity of delivery to fulfill a new subscription order.

In a further aspect of the invention, the method and system tracks the number of issues delivered by the accelerated delivery system and reconciles the issues delivered against the number of issues necessary to fulfill the new subscription order.

Additional aspects of the invention are described herebelow and defined by the appended claims. It is to be understood that both the foregoing general description and the following detailed description are exemplary and explanatory and are intended to provide further explanation of the invention as claimed.

BRIEF DESCRIPTION OF THE DRAWINGS

The following drawings illustrate certain embodiments of the present invention and constitute part of the specification.

DETAILED DESCRIPTION OF PREFERRED EMBODIMENTS

Introduction

The method and system according to one embodiment of the invention satisfies the shortcomings of the existing publication delivery methods and systems by accelerating delivery of the first few issues of a magazine subscription to a subscriber (or consumer). The method and system accomplishes this in a seamless fashion through the coordination of at least one fulfillment center and at least one printing house. All information associated with a new subscription order is stored in a database and the fulfillment center and the printing houses are notified to initiate appropriate subscriptions for each consumer. During the period in which the new subscription order information has yet to be fulfilled by the fulfillment center, the printing house continues to distribute the magazine to the subscriber. Once the subscriber's order is fulfilled through the traditional method, the fulfillment center manages subsequent magazine delivery. Information concerning prior deliveries handled by the printing houses are reported to the fulfillment center, publishers, and third parties for reconciliation purposes (revenue reconciliation, issue count reconciliation, advertising reconciliation, etc.).

System of the Invention

Figure 1:
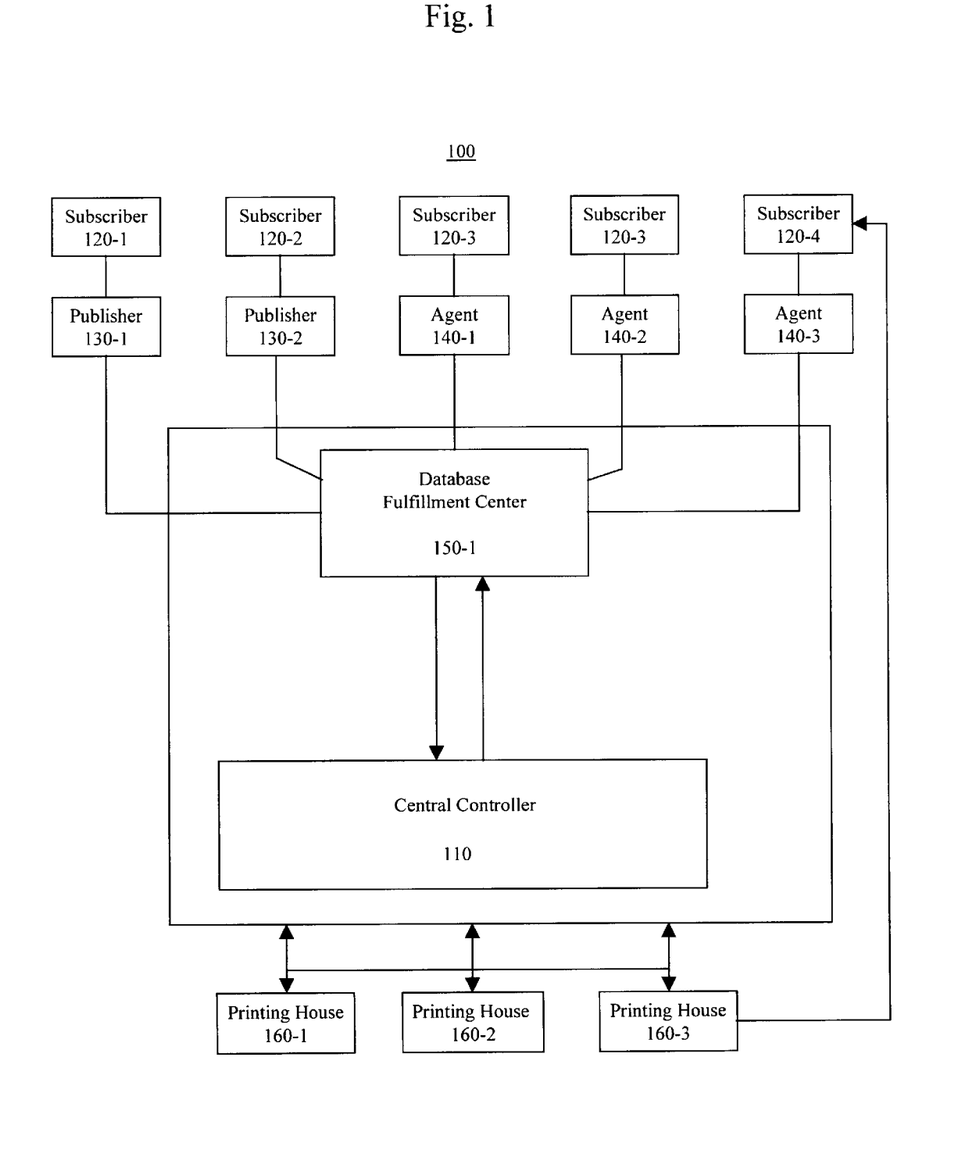
FIG. 1 is a system according to one embodiment of the present invention.

FIG. 1 shows one embodiment of the system of the present invention. In this embodiment, the system includes a central controller 110, configured to receive information from subscribers 120, and transfer data to fulfillment centers 150. In one embodiment, information is communicated between the subscriber and the data fulfillment center through magazine publishers 130. In another embodiment, such information is directed through agents 140. It should be noted that the central controller 110 may be housed within, or may be otherwise in communication with, fulfillment center 150.

Central controller 110 preferably comprises a processor-based system that maintains databases and information relating to trade publication subscriptions. Central controller 110 receives, stores and utilizes subscriber, magazine and other data to effectuate delivery of magazine subscriptions and to reconcile data, such as revenue information, issue count, circulation information, and the like. Also, the central controller 110 transmits consumer and subscription information to fulfillment house(s) 150. The structure of certain embodiments of the central controller 110 is described below in connection with FIGS. 2 and 3.

Subscribers 120 include individuals wishing to receive subscriptions to a magazine. Further, a new subscriber is a subscriber 120 who has placed a current subscription for a requested magazine and has not had such subscription for at least a predetermined time period (i.e., more than a month, more than year, ever, etc.). Accordingly, a new subscription is an order for delivery of magazine issues for a new subscriber 120. It should be noted that the term magazine may include other printed publications including, but not limited to, newsletters, trade publications, etc.

A new subscriber or consumer 120 may subscribe to a magazine publication in various manners. For example, the subscriber may send the required subscription initiation information to the magazine publisher 130. In an alternate embodiment, the consumer may complete the requested information on a card that is inserted in many magazines and return the card to an agent 140. In another embodiment, the information may be received by the agent via telephone, facsimile or some other remote consumer terminal. In one embodiment, the remote consumer terminal can be the consumer's PC or internet access device.

Consumers 120 may transmit this subscription information in various ways. For instance, consumers 120 can provide subscription information electronically by means of the internet. This is done by transmitting subscription orders electronically from a remote consumer terminal to the central controller 110, via publisher 130 or agent 140, which provides a consumer interface in the form of a web page on the internet. Two alternate ways in which a consumer may transmit subscription information to central controller 110 include (1) telephoning live operators at publisher 130 or agents 140, to verbally provide the required subscription and subscriber information; and (2) telephone answering services of publishers 130 or agents 140 that are equipped to receive the necessary information. The information may then be forwarded to central controller 110. In an alternate embodiment, the subscriber 120 may communicate the subscription information directly to central controller 110.

Fulfillment centers 150 receive all consumer information and provide subscription issues to appropriate consumers once subscriber and magazine information is processed. Each fulfillment center 150 controls at least one trade publication and possibly several more based on its relationship with respective publishers 150. In one embodiment central controller 110 transmits consumer information and subscription requests to fulfillment center(s) 150 electronically by means of the internet. Fulfillment center(s) 150 may be notified to either initiate, renew or cancel subscriptions for each consumer 120.

Publishers 130 publish trade publications and provide them to subscribers through fulfillment centers 150. Publishers 150 are billed a fee for each new subscription provided to a consumer 120. Also, publishers 150 may be billed a smaller fee for each renewal subscription provided to a consumer 120. Agents 140 are third party organizations that facilitate initiation, renewal and cancellations of trade publications. Agents also receive a fee for each new subscription, and sometimes each renewal subscription, filled by the agent 140.

Printing houses 160 are typically responsible for manufacturing trade publications, placing the subscriber's name and address on the publication cover, and entering the copies into the mail stream. In one embodiment, multiple printers 160 are utilized for a trade publication as large circulation magazines often require multiple plants to print the required copies in a timely manner. Also, weekly titles, with their highly perishable content, generally use several geographically dispersed plants to minimize the distance and time to the Post Office.

Figure 2:
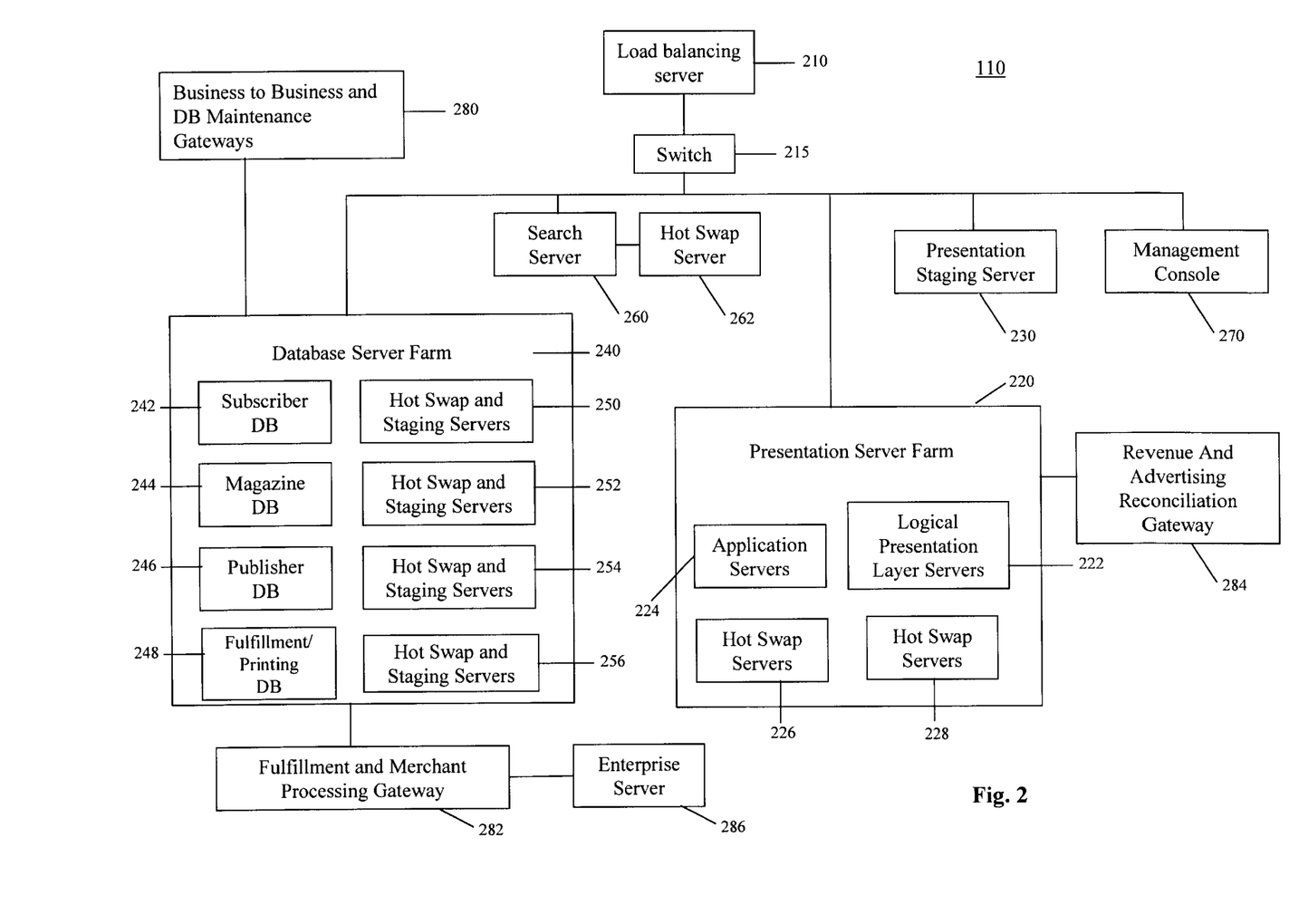
FIG. 2 illustrates one embodiment of the central controller used in the system shown in FIG. 1.

A detailed schematic of the central controller 110 will now be described with reference to FIG. 2. In general, the central controller 110 comprises a three tier or layered structure. The first layer is a logical presentation layer, which provides the graphically user interface (GUI) through which each subscriber 120 may interface with a publisher 130 or agent 140. The second layer is the application layer, which provides support logic for the GUI and establishes the business rules. The third layer is the database management layer, which interacts with the application layer to retrieve, modify, and store information. In addition to these three layers, the central controller 110 also includes an optimizing search server and a management council.

The initial components of the central controller 110 may include a load balancing server 210 and a switch 215. The load balancing server 210 distributes web hits over the architecture of the central controller 110 via the switch 215. In other words, the load balancing server 210 monitors the architecture to determine what components are relatively busy and directs traffic away from those components.

The central controller 110 also includes a presentation server farm 220. The presentation server farm 220 contains the servers that provide the functionality associated with the first and second layers of the architecture namely, the logically presentation layer and the application layer. Specifically, the presentation server farm 220 includes logical presentation servers 222 that are programmed to provide the GUI resident on the web page accessed by the subscribers 120, publishers 130, agents 140 and printing houses 160. Also part of the presentation server farm 220 are the application servers 224. The application servers 224 provide the support and logic for the GUI created by the logical presentation servers 222. As noted above, the application servers 224 also provide the business rules that govern the operation of the central controller 110.

In one embodiment of the present invention, the presentation server farm 220 also includes hot swap servers 230, 235 for both the logical presentation servers 222 and application servers 224. Such hot swap servers provide redundancy and allow for continued availability in the event of a component failure.

Related to the presentation server form 220 is the presentation staging server 230. The presentation staging server 230 provides temporary functionality of the presentation server farm 220 during the period the presentation server farm 220 (and/or the software residing on the servers) is being upgraded. The presentation staging server 230 allows the migration of the logical presentation and application layers software.

The architecture of the central controller 110 also includes a database server farm 240, which provides the functionality for the database layer. Specifically, the database server farm 240 subscriber database 242, magazine database 244, publisher database 246, and fulfillment center/printing house database 248. In the present embodiment each database is accessed, by a separate server, although in an alternate embodiment, more than one database may be accessed by the same server. The fields of each database and the purpose of each will be discussed in greater detail below.

Like the presentation server farm 220, the database server farm 240 includes a series of hot swap and staging servers 250, 252, 254, 256, one for each of the databases.

The central controller 110 also includes a search server 260 and corresponding hot swap server 262. The search server 260 is coupled to the database server farm 240 to optimize the search capability of the central controller 110. More specifically, the presentation server farm 220 controls the search server 260, which in turn, locally stores the databases 242, 244, 246, 248, as needed to perform searches. Like the other hot swap servers, the search hot swap server 262 provides redundancy should the search server 260 fail.

The central controller 110 also includes a management console 270 for monitoring the architecture. The management console 270, which in one embodiment takes the form of one or more NT workstations, monitors architecture performance, component loads, and overall network load. The management console 270 also performs the function of failure detection.

The central controller 110 also includes 3 gateways or links: a business to business and database maintenance gateway 280, a fulfillment and merchant processing gateway 282, and a revenue and advertising reconciliation gateway 284. As will become apparent to those skilled in the art based upon the following description, these gateways are communication links to other devices.

A business to business and database maintenance gateway 280 is a link to the fulfillment centers 150 and printing houses 160. In the present preferred embodiment, this gateway 280 is in the form of a wide area network (WAN), although in alternate embodiments may take the form of any network or other communication link. In the simplest embodiment, the business to business and database maintenance gateway 280 is not an electronic communication link, but rather a terminal through which the necessary information is entered. As described below, a business to business and database gateway 280 provides communication with the fulfillment centers 150 and printing houses 160 for the purposes of receiving information from the fulfillment centers 150 and printing houses 160 and transmitting subscription information to the fulfillment centers 150 and printing houses 160.

The fulfillment and merchant processing gateway 282 is also coupled to the database server farm 240. This gateway 282 provides communication to an enterprise server 286. More specifically, a central controller 110 communicates via the fulfillment and merchant processing gateway 282 with the enterprise server 286 for the purpose of fulfilling orders (by the fulfillment centers 150 and/or printing houses 160). It is to be understood that the enterprise server 286 is not limited to any particular server, but rather may take the form of any commercially available server.

The central controller 110 also includes the revenue and advertising reconciliation gateway 284. Coupled to the presentation server farm 220, this gateway 284 provides a link between the fulfillment centers 150 and printing houses 160 for publication distribution reconciliation (discussed below), as well as a link to circulation auditing organizations, such as the Audit Bureau of Circulation (ABC).

Figure 3:
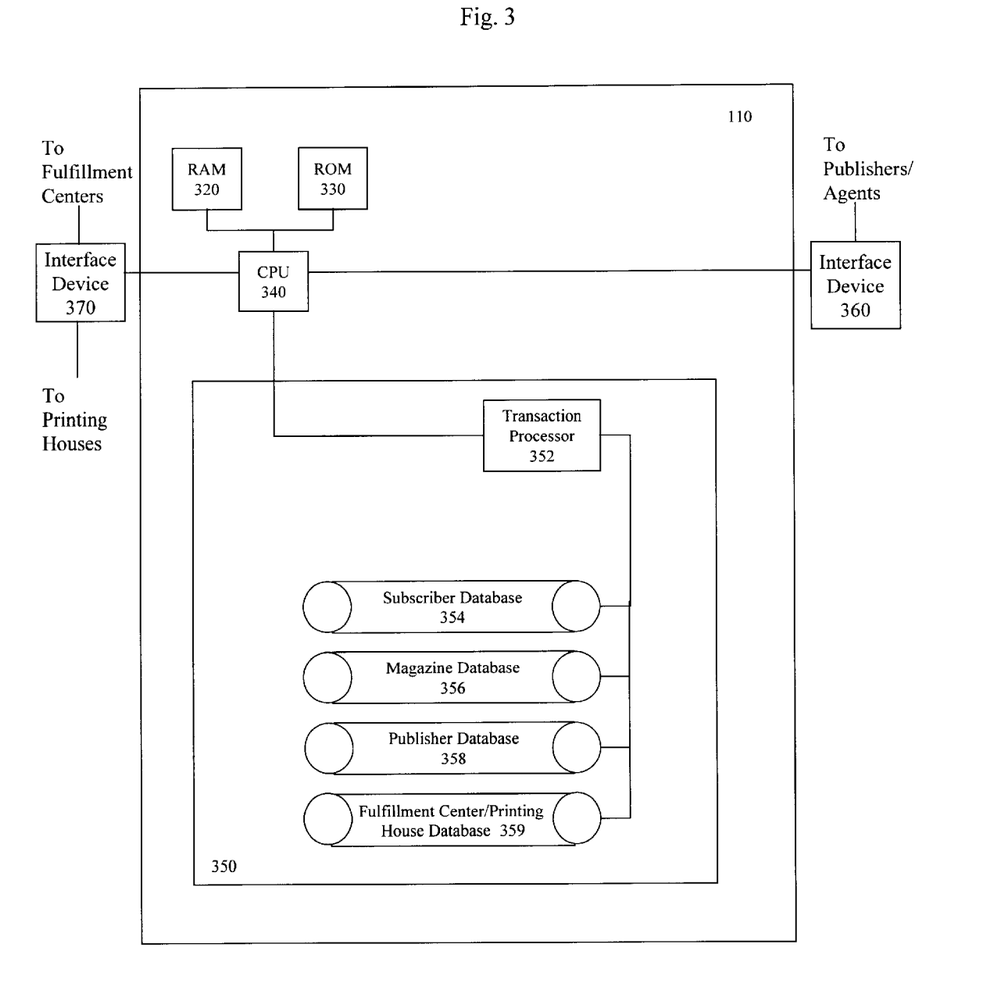
FIG. 3 illustrates another embodiment of the central controller used in the system shown in FIG. 1.

FIG. 3 illustrates an alternate embodiment of the central controller 110 for a system according to the present invention. As shown in FIG. 3, central controller 110 includes central processing unit (CPU) 340, random access memory (RAM) 320, read-only memory (ROM) 330, interface devices 360 and 370, and large capacity storage device 350. CPU 340, preferably comprising a conventional microprocessor such as an Intel Pentium Processor, is electronically coupled to each of the central controller 110's other elements.

CPU 340 executes program code stored in one or more of RAM 320, ROM 330 and storage device 350 to carry out the functions and acts described in connection with central controller 110. CPU 340 preferably comprises at least one high-speed digital data processor adequate to execute program modules for receiving subscriber and magazine information, applying customized address enhancement information accelerating the first issue(s) of a new subscription (including the production of label files), and reconciling such data. These modules are described in connection with FIGS. 8a and 8b. CPU 340 interacts with RAM 320, ROM 330 and storage device 350 to execute stored program code according to conventional data processing techniques.

Interface devices 360 and 370 comprise devices for allowing central controller 110 to communicate with subscribers 120, publishers 130, agents 140, fulfillment centers 150 and printing houses 160. Such communication is preferably electronic by means of the internet and preferably comprises a conventional high speed modem employing known communication protocols capable of decrypting encrypted data received from the remote consumer terminals 120. In an alternate embodiment, central controller 110 includes separate interface devices for the publishers 130, agents 140, fulfillment centers 150 and printing houses 160.

Large capacity storage device 350 contains transaction processor 352, subscriber database 354, magazine database 356, publisher database 358, and fulfillment center/printing house database 359. Transaction processor 352 maintains, determines and accesses data stored in the databases and effectuates accelerated delivery of new publication subscription, as well as reconcile such deliveries among the fulfillment centers 150, printing houses 160 and circulation auditing organizations as described in FIGS. 8a and 8b. Transaction processor 352 may comprise a separate, conventional CPU/microprocessor, or a portion of the operating function of CPU 340. Subscriber database 354 contains data about subscribers 120 and which new trade publications have been initiated. Magazine database 356 contains information about each trade publication, including its publisher 140, fulfillment center 150 and associated printing houses 160. Publisher database 358 contains information relating to trade publication publishers, including which trade publications each publishes. Fulfillment center/printing house database 359 contains information relating to each fulfillment center, including which trade publications are distributed by each fulfillment center, and each printing house including which publications they handle and which subscribers 120 that are serviced. Samples of the respective fields contained in databases 354, 356, 358 and 359 are shown in and described in connection with FIGS. 4–7.

Database Formats

Samples of the contents of databases 354, 356, 358 and 359 are shown in FIGS. 4–7. The specific data and fields illustrated in these figures represent only one embodiment of the records stored in the databases of the invention. In most cases, the fields shown in FIGS. 4–7 are relatively straight forward and self-explanatory. It is to be understood that the data and fields, as well as the number of databases, can be readily modified from the described embodiment and adapted to provide variations for supplying free trade publication subscriptions and gathering consumer information. Furthermore, each field may contain more or less information. For example, an address field may be divided into separate fields containing street address, apartment number, city, state and zip code.

Figure 4:
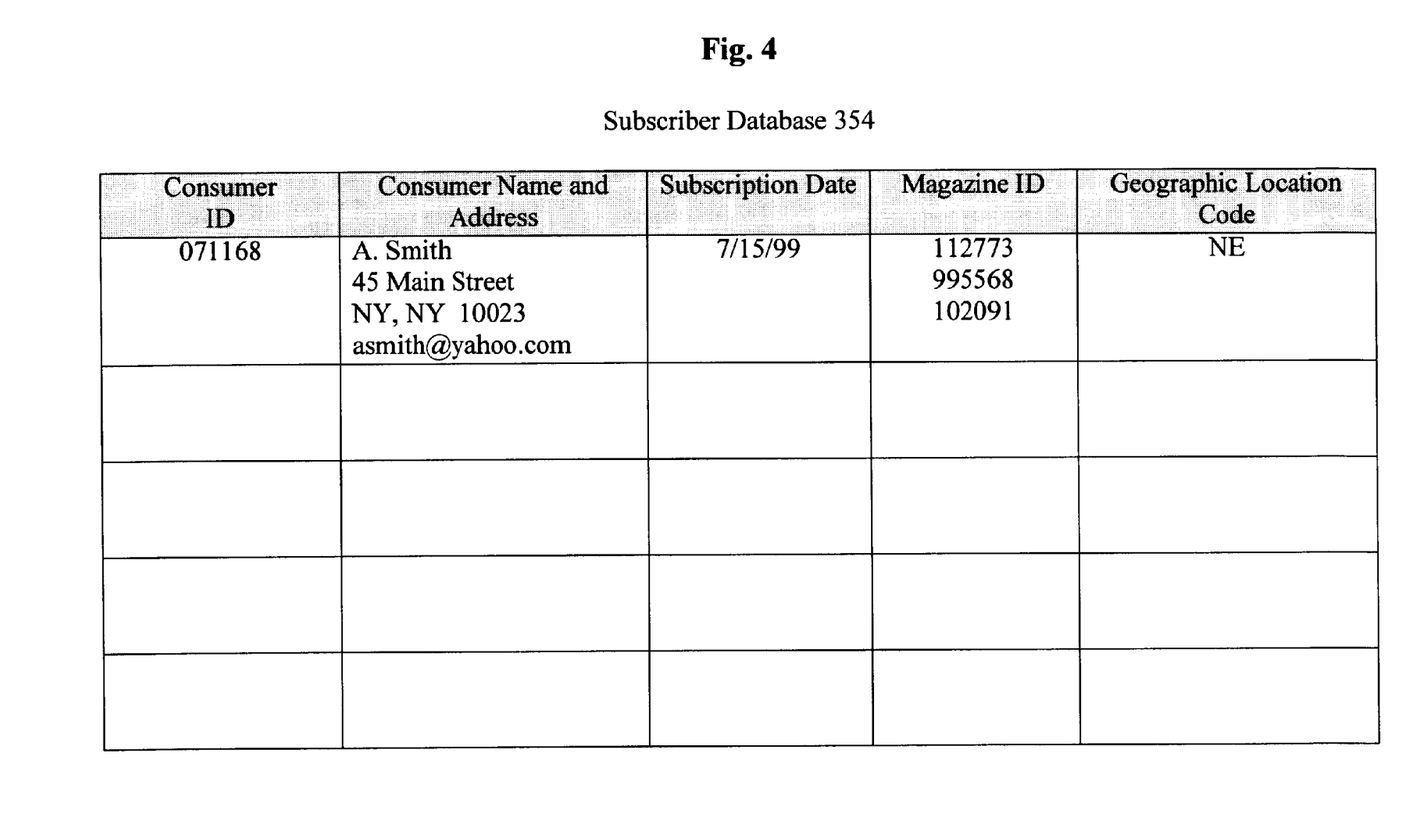
FIG. 4 illustrates a sample of the contents of the subscriber database stored in central controller shown in FIGS. 2–3.

Subscriber database 354 maintains (among other information) a compilation of all information provided by each subscriber 120 to initiate a new publication subscription. The information may be communicated to the publisher directly, an agent, or some other party facilitating the processing of new subscriptions. In one embodiment, each record in subscriber database 354 corresponds to one subscriber.

FIG. 4 illustrates a sample record. As shown in FIG. 4, subscriber database 354 contains fields corresponding to, for example, subscriber ID, subscriber name, subscriber address and e-mail address, subscription date, magazine ID and geographic location code. The fields whose data is provided directly by the subscriber by some form of a subscriber information retrieval process (mail in card, on line registration, etc.) include the consumer name, consumer address and e-mail address. The subscription date is the date a consumer signed up each new subscription. The geographic location code is used by the printing houses 160 to determine which printing house 160 (when more than one is associated with a publication) will serve the subscriber 120 based on the publication delivery location. From this data and data stored in other databases, the data for the remaining fields can be calculated.

Figure 5:
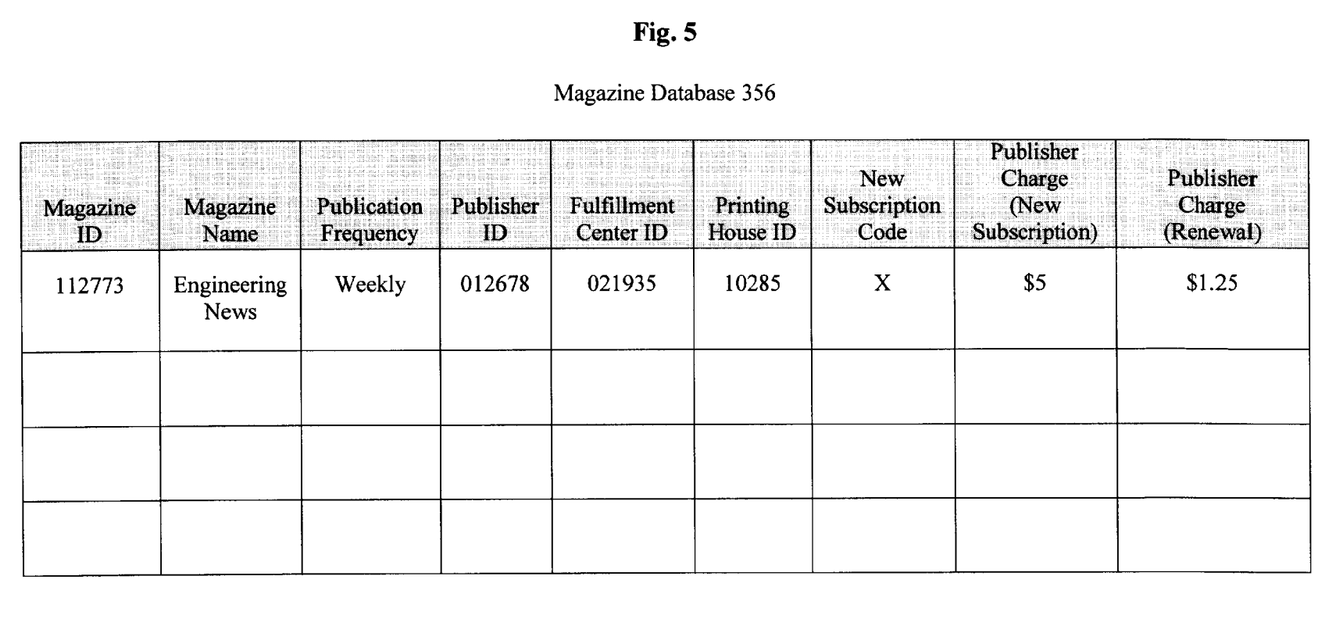
FIG. 5 illustrates a sample of the contents of the magazine database stored in central controller shown in FIGS. 2–3.

Magazine database 356 contains information about trade publications offered to consumers. FIG. 5 illustrates a sample record of magazine database 356. As shown in FIG. 5, magazine database 356 contains trade publication information having fields corresponding to magazine ID, magazine name, publisher ID, fulfillment center ID, printer house ID, and new subscription code.

The new subscription code field is provided in the present embodiment so that the new subscription information may be monitored. As described more fully below, new subscriptions will be delivered, at first, by the printing house 160 directly, and subsequently by the fulfillment center 150. Thus, printing house delivery information is reconciled among the fulfillment centers 150, printing houses 160, and other parties such as circulation auditing organizations and the like. In one embodiment, the monitoring will be implemented by transaction processor 352.

The frequency field identifies the frequency in which a new publication is delivered to subscribers. Because the accelerated delivery process often covers the first six to eight weeks of a new subscription, the number of publication issues accelerated by the printing houses 160 will vary from one to two for monthly publications to as many as eight or more for weekly publications. The new subscription code and publication frequency assist in the tracking of those issues that are subject to the accelerated delivery process described below. From this data and data stored in other databases, the data for the remaining fields can be calculated.

Figure 6:
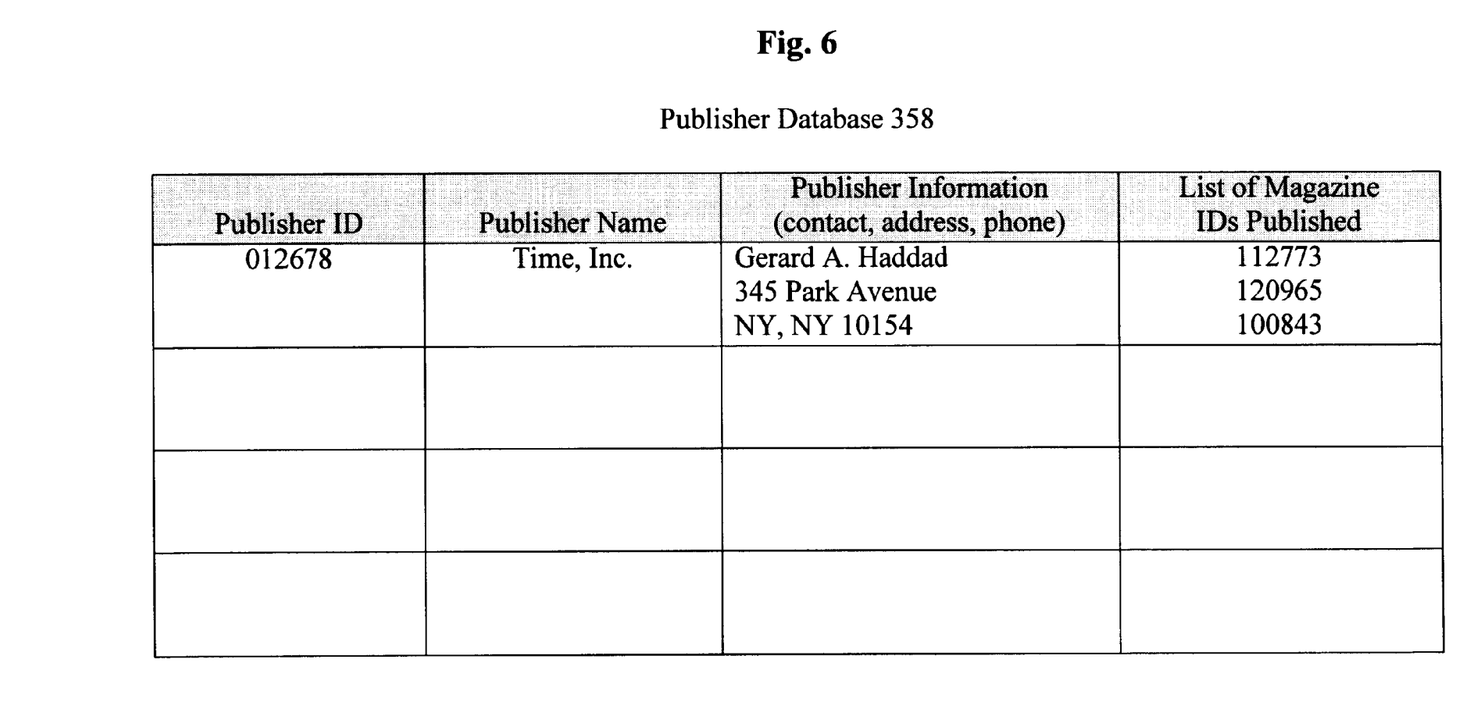
FIG. 6 illustrates a sample of the contents of the publisher database stored in central controller shown in FIGS. 2–3.

Publisher database 358 contains information about the trade publication publishers. FIG. 6. illustrates a sample record of publisher database 358. As shown in FIG. 6, publisher data base 358 contains publisher records having fields corresponding to, for example, publisher ID, publisher name, publisher contact information and list of magazine ID's published. Like the data in magazine database 356, data in publisher database 358 is also provided and periodically updated by publishers 130.

Figure 7:
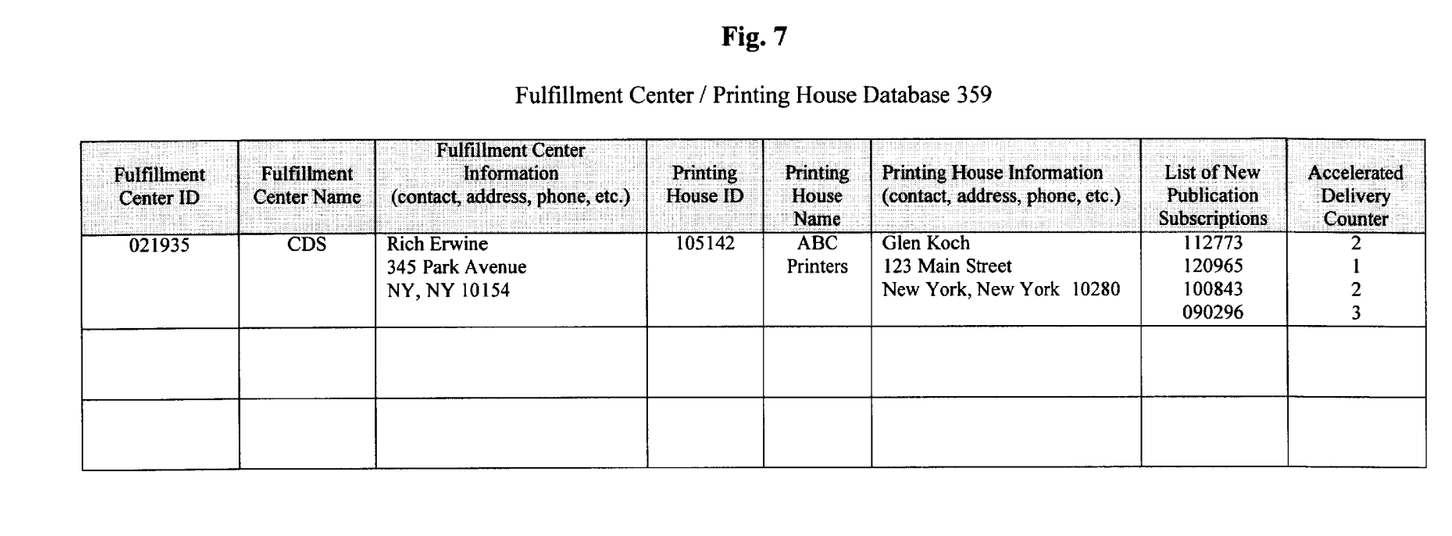
FIG. 7 illustrates a sample of the contents of the fulfillment center/printing house database stored in central controller shown in FIGS. 2–3.

Finally, fulfillment center/printing house database 359 contains information about trade publication fulfillment centers 150 and printing houses 160. FIG. 7 illustrates a sample record of fulfillment center/printing house database 359. As shown in FIG. 7, each record of fulfillment house database 359 corresponds to a particular fulfillment center 150 and printing house 160 and has fields corresponding to, for example, fulfillment center ID, fulfillment center name, fulfillment center contact information, printing house ID, printing house name, printing house contact information, list of new publication subscriptions, and accelerated delivery count for each new subscription. Like the data in magazine database 356 and publisher database 358, data in fulfillment center/printing house database 359 is also provided and periodically updated by publishers 130, agents 140, fulfillment centers 150, and printing houses 160.

The process of using data from subscriber database 354, magazine database 356, publisher database 358 and fulfillment center/printing house database 359 to determine and provide free trade publication subscriptions to subscribers 120 is represented in the flow chart of FIGS. 8a and 8b, described in detail below. Central controller 110 uses subscriber database 354, magazine database 356, publisher database 358 and fulfillment center/printing house database 359 to determine appropriate subscription information for each subscriber 120 and to facilitate seamless accelerated delivery of new publication subscriptions for each subscriber 120 while also reconciling business data, such as revenue, issue count and advertising monitoring information.

Accelerated Delivery Process

Figure 8A:
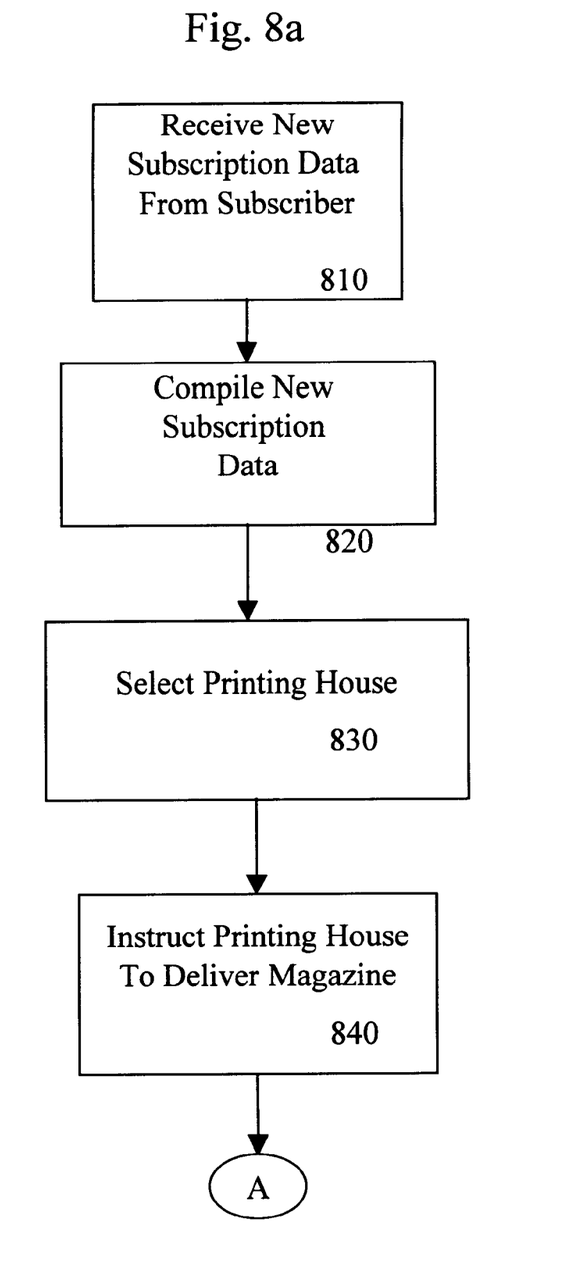
FIGS. 8a and 8b are flow charts of the overall operation of one embodiment of the present invention.
Figure 8B:
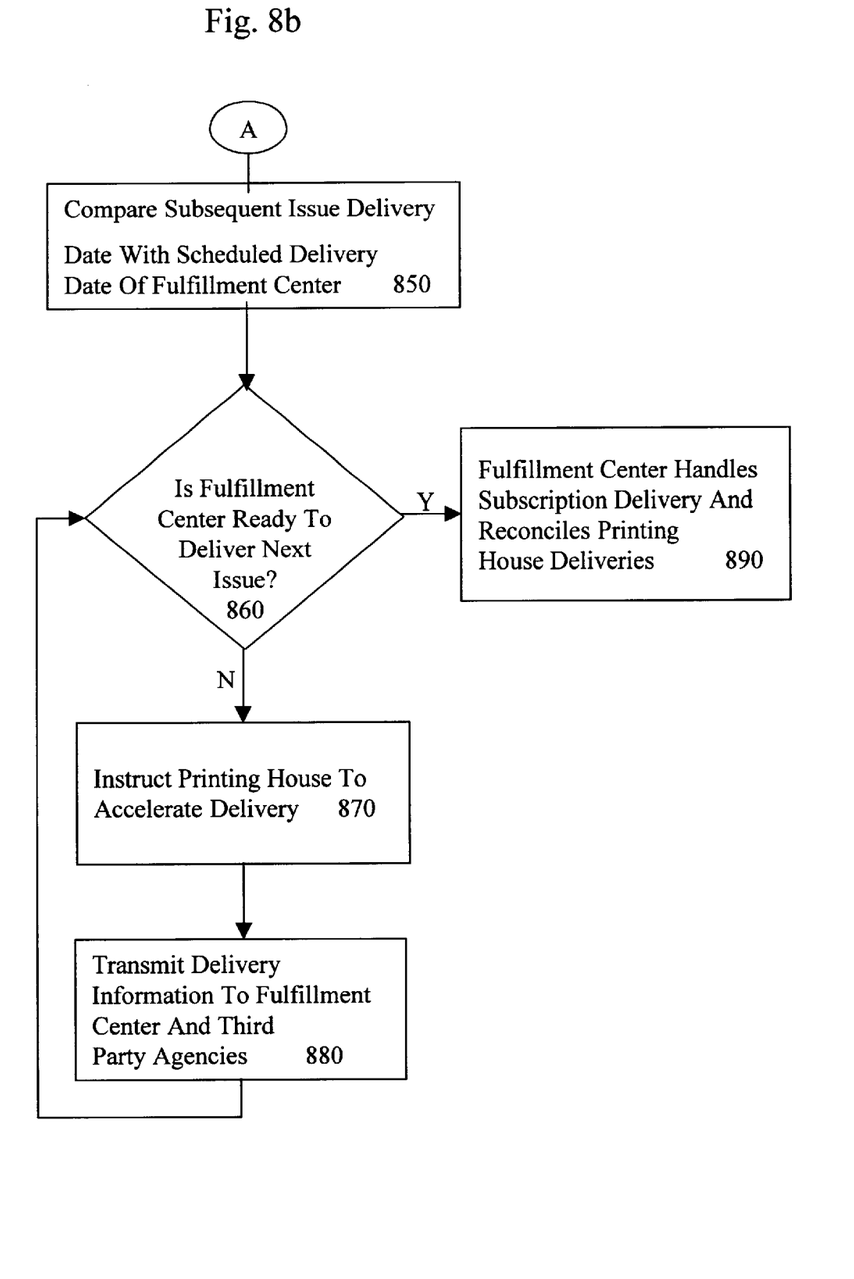

The accelerated subscription delivery process illustrated in FIGS. 8a and 8b involves a series of steps utilizing the data stored in databases 354, 356, 358 and 359 wherein subscribers 120, publishers 130, agents 140, fulfillment centers 150 and printing houses 160 may benefit from accelerating the delivery of the first issue(s) of a new publication subscription. Subscribers 120 benefit because the ordered publications are received by the consumer 120 in an expedited manner. For example, a delay in delivery of first issues of a new subscription, which may be six to eight weeks, is obviated. Publishers 130, agents 140, fulfillment centers 150 and printing houses 160 benefit as, in addition to providing improved customer service, issues of a subscription are more quickly filled, resulting in additional potential revenue to these parties (i.e., renewals arise more quickly, more publications are distributed, etc.).

Although the system and method is described wherein data is communicated largely over the internet, the system and method are not limited to such channel of communication. For example, in many cases, agent 140 initiates new subscription processing by collecting data from new subscribers 120 (step 810) which, in one embodiment, is supplied by completed magazine inserts mailed by the subscriber 120 to the agent 140. This information may be communicated from the publishers 130 and agents 140 to the fulfillment centers 150 and printing houses 160 via the internet. Thus, the method and system may employ one or more communication channels (i.e., mail, internet, facsimile, e-mail, etc.).

After the new subscription data is received, CPU 340 of central controller 110 compiles the data received from subscriber database 354, magazine database 356, publisher database 358 and fulfillment center/printing house database 359 in step 820 in order to identify the requested publication title, delivery frequency, publisher charges, etc. Furthermore the appropriate printing house 160 for effectuating delivery is determined and accessed (step 830). For example, the magazine ID and subscriber geographic code may determine which fulfillment center 150 and printing house 160 will be selected to effectuate publication delivery. Thus, if a subscription for Engineering News is ordered by a subscriber 120 living in the Northeast (code=NE), then the fulfillment center 150 and printing house 160 that handles such publication in the Northeast will be accessed. In this process, United States Postal Service addressing standards are applied to customers' addresses. It should be noted that, in one embodiment, only new issue(s) of new subscriptions are accelerated by the printing house 160. CPU 340 of central controller 110 recognizes that a subscription is designated as new by the new subscription code (i.e., code=X) of magazine database 356. In step 840, central controller 110 instructs printing house 160 to deliver the first issue of a new publication subscription. Accordingly, no delay is recognized by the customer as information processing by the fulfillment center 150 need not be complete.

In step 850, CPU 340 compares subsequent issue delivery date with the scheduled delivery date of the fulfillment center. Magazine database 356 may have a publication frequency field that identifies the frequency in which a publication is delivered. Processing this data along with the subscription date information (the date that the first issue of new subscription may be delivered by printing house 160) stored in the subscription date field of subscription database 354 enables central controller 110 to determine the subsequent issue delivery dates. A determination is made by CPU 340, in step 860, determining whether the associated fulfillment center 150 is prepared to deliver the next issue. If the fulfillment center 150 has yet to process all of the information necessary to deliver issues of a new publication subscription, the selected printing house 160 continues the accelerated delivery process by delivering the next issue (step 870). In step 880, the delivery information is transmitted to fulfillment center 150 for revenue and issue count reconciliation as well as any third parties requiring such information. An example of third parties requiring issue circulation information are circulation auditing organizations, such as the Audit Bureau of Circulation (ABC). These companies monitor the data associated with publication circulation for the purpose of assisting in the allocation of advertising revenue.

When the date for the next new subscription issue arrives, the method and system again determines whether the fulfillment center 150 is ready to deliver the next issue (step 860). Once the fulfillment center 150 is prepared for issue delivery, the fulfillment center 150 handles the current and subsequent issue delivery and reconciles data with the printing house 160 as well as third party organizations (step 890). The issue count reconciliation enables the fulfillment center 150 and printing house 160 to ensure that the correct count is made with respect to the number of publication issues that have been delivered to subscriber 120. The cooperation of the fulfillment center 150 and printing house 160 facilitates the expeditious and seamless delivery of a new publication subscription to the subscriber 120.

The many features and advantages of the present invention are apparent from the detailed specification, and thus, it is intended by the appended claims to cover all such features and advantages of the invention which fall within the true spirit and scope of the claims.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

What is claimed is:

1. A method operable on a computer of accelerating delivery of at least one issue of a new publication subscription, comprising:

receiving from a subscriber subscription information for a new subscription to a publication;

selecting a printing house to provide a first issue of the new subscription to the subscriber;

communicating electronically to the printing house the subscription information and a request to effectuate delivery of the first issue of the new subscription to the subscriber;

communicating the subscription information to a fulfillment center;

determining whether a fulfillment center has completed processing data to deliver at least one subsequent issue of the new subscription to the subscriber; and effectuating delivery of said at least one subsequent issue of the new subscription from the printing house to the subscriber when the fulfillment center has not completed processing said data.

2. The method according to claim 1, wherein said subsequent issue delivery is made from the printing house until the fulfillment center has completed said processing.

3. The method according to claim 1, further comprising:

comparing a subsequent issue delivery date with a scheduled fulfillment center delivery date to determine whether the fulfillment center has completed the processing of said data.

4. The method according to claim 1, further comprising:

reconciling printing house delivery information with the fulfillment center.

5. The method according to claim 4, wherein the delivery information is revenue data.

6. The method according to claim 4, wherein the delivery information is circulation data.

7. The method according to claim 1, further comprising:

reconciling printing house delivery information with a third party.

8. The method according to claim 7, wherein the third party is an circulation auditing organization.

9. The method according to claim 8, wherein the delivery information is circulation data.

10. The method according to claim 1, wherein the printing house is selected based on publication information and subscriber geographic location.

11. A method operable on a computer of accelerating delivery of at least one issue of a new publication subscription, comprising:

receiving from a subscriber subscription information for a new subscription to a publication;

selecting a printing house to provide a first issue of the new subscription to the subscriber;

communicating electronically to the printing house the subscription information and a request to effectuate delivery of the first issue of the new subscription to the subscriber;

communicating the subscription information to a fulfillment center;

determining whether a fulfillment center has completed processing data to deliver at least one subsequent issue of the new subscription to the subscriber;

comparing a subsequent issue delivery date with a scheduled fulfillment center delivery date for the determining of whether the fulfillment center has completed processing of said data;

effectuating delivery of said at least one subsequent issue of the new subscription from the printing house to the subscriber when the fulfillment center has not completed processing said data; and reconciling printing house information.

12. A system for accelerating delivery of at least one issue of a new publication subscription, comprising:

means for receiving from a subscriber subscription information for a new subscription to a publication;

means for selecting a printing house to provide a first issue of the new subscription to the subscriber;

means for communicating to the printing house the subscription information and a request to effectuate delivery of the first issue of the new subscription to the subscriber;

means for communicating the subscription information to a fulfillment center;

means for determining whether the fulfillment center has completed processing data to deliver at least one subsequent issue of the new subscription to the subscriber; and means for effectuating delivery of said at least one subsequent issue of the new subscription from the printing house to the subscriber when the fulfillment center has not completed processing said data.

13. The system according to claim 12, wherein said subsequent issue delivery is made from the printing house until the fulfillment center has completed said processing.

14. The system according to claim 12, further comprising:

means for comparing a subsequent issue delivery date with a scheduled fulfillment center delivery date to determine whether the fulfillment center has completed the processing of said data.

15. The system according to claim 12, further comprising:

means for reconciling printing house delivery information with the fulfillment center.

16. The system according to claim 15, wherein the delivery information is revenue data.

17. The system according to claim 15, wherein the delivery information is circulation data.

18. The system according to claim 12, further comprising:

means for reconciling printing house delivery information with a third party.

19. The system according to claim 18, wherein the third party is an circulation auditing organization.

20. The system according to claim 19, wherein the delivery information is circulation data.

21. The system according to claim 12, wherein the printing house is selected based on publication information and subscriber geographic location.

22. A system of accelerating delivery of at least one issue of a new publication subscription, comprising:

means for receiving from a subscriber subscription information for a new subscription to a publication;

means for selecting a printing house to provide a first issue of the new subscription to the subscriber;

means for communicating to the printing house the subscription information and a request to effectuate delivery of the first issue of the new subscription to the subscriber;

means for communicating the subscription information to a fulfillment center;

means for determining whether the fulfillment center has completed processing data to deliver at least one subsequent issue of the new subscription;

means for comparing a subsequent issue delivery date with a scheduled fulfillment center delivery date for the determining of whether the fulfillment center has completed processing of said data;

means for effectuating delivery of said at least one subsequent issue of the new subscription from the printing house to the subscriber when the fulfillment center has not completed processing said data; and means for reconciling printing house information.

23. A system for accelerating delivery of at least one issue of a new publication subscription, comprising:

at least one storage device for storing subscriber and magazine data; and a central processing unit configured to receive from a subscriber subscription information for a new subscription to a publication, select a printing house to provide a first issue of the new subscription to the subscriber; communicate to the printing house the subscription information and a request to effectuate delivery of the first issue of the new subscription to the subscriber, communicate the subscription information to a fulfillment center, determine whether the fulfillment center has completed processing data to deliver at least one subsequent issue of the new subscription, and effectuate delivery of said at least one subsequent issue of the new subscription from the printing house to the subscriber when the fulfillment center has not completed processing said data.

24. The system according to claim 23, wherein said subsequent issue delivery is made from the printing house until the fulfillment center has completed said processing.

25. The system according to claim 23, wherein the central processing unit is further configured to compare a subsequent issue delivery date with a scheduled fulfillment center delivery date to determine whether the fulfillment center has completed the processing of said data.

26. The system according to claim 23, wherein the central processing unit is further configured to reconcile printing house delivery information with the fulfillment center.

27. The system according to claim 26, wherein the delivery information is revenue data.

28. The system according to claim 26, wherein the delivery information is circulation data.

29. The system according to claim 23, wherein the central processing unit is further configured to reconcile printing house delivery information with a third party.

30. The system according to claim 29, wherein the third party is an circulation auditing organization.

31. The system according to claim 30, wherein the delivery information is circulation data.

32. A system of accelerating delivery of at least one issue of a new publication subscription, comprising:

a database storing magazine data, subscription data, fulfillment center data and printing house data; and a central processing unit configured to receive from a subscriber subscription information for a new subscription to a publication, select a printing house to provide a first issue of the new subscription to the subscriber; communicate to the printing house the subscription information and a request to effectuate delivery of the first issue of the new subscription to the subscriber, communicate the subscription information to a fulfillment center, determine whether the fulfillment center has completed processing data to deliver at least one subsequent issue of the new subscription, compare a subsequent issue delivery date with a scheduled fulfillment center delivery date for the determining of whether the fulfillment center has completed processing of said data, effectuate delivery of said at least one subsequent issue of the new subscription from the printing house to the subscriber when the fulfillment center has not completed processing said data, and reconcile printing house information.

33. The system according to claim 32, wherein the printing house is selected based on publication information and subscriber geographic location.

34. Computer executable software code stored on a computer readable medium, the code for accelerating delivery of at least one issue of a new publication subscription, comprising:

code to receive from a subscriber subscription information for a new subscription to a publication;

code to select a printing house to provide a first issue of the new subscription to the subscriber;

code to communicate to the printing house the subscription information and a request to effectuate delivery of the first issue of the new subscription to the subscriber;

code to communicate the subscription information to a fulfillment center;

code to determine whether the fulfillment center has completed processing data to deliver at least one subsequent issue of the new subscription to the subscriber; and code to effectuate delivery of said at least one subsequent issue of the new subscription from the printing house to the subscriber when the fulfillment center has not completed processing said data.

35. Computer executable software code stored on a computer readable medium, the code for accelerating delivery of at least one issue of a new publication subscription, comprising:

code to receive from a subscriber subscription information for a new subscription to a publication;

code to select a printing house to provide a first issue of the new subscription to the subscriber;

code to communicate to the printing house the subscription information and a request to effectuate delivery of the first issue of the new subscription to the subscriber;

code to communicate the subscription information to a fulfillment center;

code to determine whether the fulfillment center has completed processing data to deliver at least one subsequent issue of the new subscription to the subscriber;

code to compare a subsequent issue delivery date with a scheduled fulfillment center delivery date for the determining of whether the fulfillment center has completed processing of said data;

code to effectuate delivery of said at least one subsequent issue of the new subscription from the printing house to the subscriber when the fulfillment center has not completed processing said data; and code to reconcile printing house information.

36. A computer readable medium having computer executable software code stored thereon, the code for accelerating delivery of at least one issue of a new publication subscription, comprising:

code to receive from a subscriber subscription information for a new subscription to a publication;

code to select a printing house to provide a first issue of the new subscription to the subscriber;

code to communicate to the printing house the subscription information and a request to effectuate delivery of the first issue of the new subscription to the subscriber;

code to communicate the subscription information to a fulfillment center;

code to determine whether the fulfillment center has completed processing data to deliver at least one subsequent issue of the new subscription to the subscriber; and code to effectuate delivery of said at least one subsequent issue of the new subscription from the printing house to the subscriber when the fulfillment center has not completed processing said data.

37. A computer readable medium having computer executable software code stored thereon, the code for accelerating delivery of at least one issue of a new publication subscription, comprising:

code to receive from a subscriber subscription information for a new subscription to a publication;

code to select a printing house to provide a first issue of the new subscription to the subscriber;

code to communicate to the printing house the subscription information and a request to effectuate delivery of the first issue of the new subscription to the subscriber;

code to communicate the subscription information to a fulfillment center;

code to determine whether the fulfillment center has completed processing data to deliver at least one subsequent issue of the new subscription to the subscriber;

code to compare a subsequent issue delivery date with a scheduled fulfillment center delivery date for the determining of whether the fulfillment center has completed processing of said data;

code to effectuate delivery of said at least one subsequent issue of the new subscription from the printing house to the subscriber when the fulfillment center has not completed processing said data; and code to reconcile printing house information.

38. A programmed computer for accelerating delivery of at least one issue of a new publication subscription, comprising:

a memory for having at least one region for storing computer executable program code; and a processor for executing the program code stored in memory, wherein the program code includes:

code to receive from a subscriber subscription information for a new subscription to a publication;

code to select a printing house to provide a first issue of the new subscription to the subscriber;

code to communicate to the printing house the subscription information and a request to effectuate delivery of the first issue of the new subscription to the subscriber;

code to communicate the subscription information to a fulfillment center;

code to determine whether the fulfillment center has completed processing data to deliver at least one subsequent issue of the new subscription to the subscriber; and code to effectuate delivery of said at least one subsequent issue of the new subscription from the printing house to the subscriber when the fulfillment center has not completed processing said data.

39. A programmed computer for accelerating delivery of at least one issue of a new publication subscription, comprising:

a memory for having at least one region for storing computer executable program code; and a processor for executing the program code stored in memory, wherein the program code includes:

code to receive from a subscriber subscription information for a new subscription to a publication;

code to select a printing house to provide a first issue of the new subscription to the subscriber;

code to communicate to the printing house the subscription information and a request to effectuate delivery of the first issue of the new subscription to the subscriber;

code to communicate the subscription information to a fulfillment center;

code to determine whether the fulfillment center has completed processing data to deliver at least one subsequent issue of the new subscription to the subscriber;

code to compare a subsequent issue delivery date with a scheduled fulfillment center delivery date for the determining of whether the fulfillment center has completed processing of said data;

code to effectuate delivery of said at least one subsequent issue of the new subscription from the printing house to the subscriber when the fulfillment center has not completed processing said data; and code to reconcile printing house information.

40. A method operable on a computer for accelerating delivery of at least one issue of a new publication subscription, comprising:

receiving from a subscriber subscription information for a new subscription to a publication;

selecting a printing house to provide a first issue of the new subscription to the subscriber;

communicating electronically to the printing house the subscription information and a request to effectuate delivery of the first issue of the new subscription to the subscriber;

communicating the subscription information to a fulfillment center for fulfillment of the remaining issues of the subscription;

effectuating delivery of one or more subsequent issues from the printing house to the subscriber until the fulfillment center is prepared to fulfill the subscription; and effectuating delivery of the remaining issues of the subscription from the fulfillment house.

41. A system for accelerating delivery of at least one issue of a new publication subscription, comprising:

a processor;

an input device connected to the processor;

an output device connected to the processor; and a memory connected to the processor and storing instructions for operating the processor to perform the steps of receiving on the input device subscription information for a new subscription by a subscriber to a publication;

selecting a printing house to provide a first issue of the new subscription to the subscriber;

communicating electronically on the output device to the printing house the subscription information and a request to effectuate delivery of the first issue of the new subscription to the subscriber;

communicating the subscription information to a fulfillment center for fulfillment of the remaining issues of the subscription;

communicating to the printing house information effectuating delivery of one or more subsequent issues from the printing house to the subscriber until the fulfillment center is prepared to fulfill the subscription; and communicating to the fulfillment center information effectuating delivery of the remaining issues of the subscription from the fulfillment house.

42. A system for accelerating delivery of at least one issue of a new publication subscription, comprising:

means for receiving from a subscriber subscription information for a new subscription to a publication;

means for selecting a printing house to provide a first issue of the new subscription to the subscriber;

means for communicating electronically to the printing house the subscription information and a request to effectuate delivery of the first issue of the new subscription to the subscriber;

means for communicating the subscription information to a fulfillment center for fulfillment of the remaining issues of the subscription; and means for effectuating delivery of one or more subsequent issues from the printing house to the subscriber until the fulfillment center is prepared to fulfill the subscription; and means for effectuating delivery of the remaining issues of the subscription from the fulfillment house.

\* \* \* \* \*